United States Patent
Huber

(10) Patent No.: US 8,105,676 B2
(45) Date of Patent: Jan. 31, 2012

(54) METHOD FOR FASTENING A SILICON BLOCK ON A SUPPORT INTENDED THEREFOR AND CORRESPONDING ARRANGEMENT

(75) Inventor: Reinhard Huber, Freudenstadt-Dietersweiler (DE)

(73) Assignee: Gebr. Schmid GmbH & Co. (DE)

( * ) Notice: Subject to any disclaimer, the term of this patent is extended or adjusted under 35 U.S.C. 154(b) by 0 days.

(21) Appl. No.: 12/960,005

(22) Filed: Dec. 3, 2010

(65) Prior Publication Data

US 2011/0070397 A1 Mar. 24, 2011

Related U.S. Application Data

(63) Continuation of application No. PCT/EP2009/004067, filed on Jun. 5, 2009.

(30) Foreign Application Priority Data

Jun. 6, 2008 (DE) .......................... 10 2008 028 213

(51) Int. Cl.
*B32B 7/12* (2006.01)
*B32B 37/14* (2006.01)
*B32B 37/06* (2006.01)
*B32B 3/04* (2006.01)

(52) U.S. Cl. .......... 428/121; 136/243; 136/244; 156/60; 156/272.2; 156/275.7; 156/276; 428/98; 428/446

(58) Field of Classification Search .................... 428/98, 428/121, 446; 136/243, 244; 156/60, 272.2, 156/275.7, 276

See application file for complete search history.

(56) References Cited

U.S. PATENT DOCUMENTS

| | | | |
|---|---|---|---|
| 4,745,078 A * | 5/1988 | Stetter et al. ..................... 438/74 |
| 4,897,141 A | 1/1990 | Girard |
| 6,113,718 A * | 9/2000 | Yamada et al. .................. 156/78 |
| 6,558,503 B1 | 5/2003 | Healey |
| 6,583,383 B2 | 6/2003 | Higashi et al. |
| 6,855,760 B1 | 2/2005 | Kirsten et al. |
| 2001/0050101 A1* | 12/2001 | Makita et al. .................. 136/244 |
| 2003/0075210 A1* | 4/2003 | Stollwerck et al. ........... 136/243 |
| 2007/0199653 A1 | 8/2007 | Lockwood |
| 2009/0226702 A1 | 9/2009 | Madsen et al. |

FOREIGN PATENT DOCUMENTS

| | | |
|---|---|---|
| DE | 59 353 A1 | 12/1967 |
| DE | 30 21 263 A1 | 12/1981 |
| DE | 44 37 599 A1 | 4/1996 |
| GB | 1 326 331 A | 8/1973 |
| GB | 1 387 590 A | 3/1975 |

* cited by examiner

*Primary Examiner* — Brent O'Hern
(74) *Attorney, Agent, or Firm* — Akerman Senterfitt

(57) ABSTRACT

In order to fasten a silicon block on a support for improved further handling, fiber material is introduced into an adhesive joint between the silicon block and the support. The fiber material is impregnated with adhesive and consists of glass fibers. The silicon block is then positioned on the support. The fiber material assures that the adhesive joint is not pressed together too far and is more stable.

16 Claims, 2 Drawing Sheets

METHOD FOR FASTENING A SILICON BLOCK ON A SUPPORT INTENDED THEREFOR AND CORRESPONDING ARRANGEMENT

CROSS-REFERENCE TO RELATED APPLICATIONS

This application is a continuation of PCT Application No. PCT/EP2009/004067, filed Jun. 5, 2009, and claims priority to DE 102008028213.8 filed Jun. 6, 2008, the disclosures of which are hereby incorporated by reference in their entirety.

FIELD OF APPLICATION AND PRIOR ART

The invention relates to a method for fastening a block or the like composed of silicon on a support intended therefor, and to the corresponding arrangement of a silicon block on a support of this type.

It is known for silicon blocks from which wafers for solar cells are sawn, for example, to be fastened on a support for this processing step and also for further processing steps. This is usually effected by means of adhesive bonding, wherein the silicon block is fixedly adhesively bonded to the support. The further handling of the silicon block, in particular transport, can then be effected by gripping the support, where the silicon block then usually hangs below the support. In this case, it is often problematic to obtain a reasonably uniform adhesive joint, in particular with precisely desired orientation between support, on the one hand, and silicon block, on the other hand.

PROBLEM AND SOLUTION

The invention is based on the problem of providing a method mentioned in the introduction and an arrangement mentioned in the introduction by means of which problems in the prior art can be avoided and, in particular, a simple, reliable and precisely defined connection between silicon block and support can be produced.

This problem is solved by a method comprising the features of claim 1 and an arrangement comprising the features of claim 11. Advantageous and preferred configurations of the invention are the subject matter of the further claims and are explained in more detail below. Some of the features applicable to the invention are described only in connection with the method or the arrangement. Irrespective of this, however, they are intended to be able to be applicable both to the method and to the arrangement. The wording of the claims is incorporated in the content of the description by express reference.

The invention provides for the adhesive bonding between silicon block and support to be effected by means of an adhesive layer in an adhesive joint, wherein the adhesive layer comprises fibre material and adhesive. This means, therefore, that, primarily as a result of the fibre material in the adhesive joint, a type of spacer arrangement is possible, and the adhesive joint, for example as a result of the weight of the silicon block bearing on the support, cannot become excessively small as a result of displacement of the adhesive itself. A minimum thickness of the adhesive joint thus remains, which can be varied by means of the type, composition and thickness of the fibre material used.

Advantageously, the fibre material is impregnated or generally provided with the adhesive prior to fitting to or placement on the silicon block or the support. This can be effected for example by spraying onto the fibre material from at least one side. Such application of the adhesive to the planar fibre material or impregnation is advantageously the sole step with adhesive. In an extension, provision can be made for spreading or thinly coating adhesive on at least one of the two sides of silicon block or support that are to be adhesively bonded. This can be effected by spraying on, spreading on or rolling on.

In order to prevent adhesive from running on the silicon block, it can be provided that the side of the silicon block that is provided for adhesive bonding faces downwards during the entire adhesive bonding process at least until the adhesive has at least partly cured, such that it no longer flows as readily. It is thus possible to avoid a situation in which adhesive that has leaked out or dripping adhesive has to be laboriously removed from the silicon block.

Advantageously, the fibre material is uniformly distributed over the entire adhesive surface or adhesive joint. With particular advantage, it even protrudes laterally.

In a configuration of the invention, the fibre material can project beyond the support, particularly when it is fixed as a result of the cured adhesive. Advantageously, the adhesive alone or together with the fibre material may engage over the support laterally and particularly advantageously be connected to the support. It is thereby also possible for example to improve the stability of the adhesive connection between support and silicon block against lateral movements. It is possible to permit the fibre material, as it engages over the support laterally, to engage into a recess, for example in the manner of a groove or depression, in the support. A type of interlocking of the support by the adhesive alone or together with the fibre material can thus be achieved as reinforced fastening of the fibre material or the adhesive layer to the support. In order to comply with a distance between silicon block and support that is as uniform as possible, the fibre material can have a uniform material thickness over its area. This uniform material thickness should be present in particular including when said material is impregnated or fully saturated with adhesive or when a high pressure is exerted on the adhesive joint, for example because the silicon block bears on the support and presses with its own weight onto the adhesive joint and thus the fibre material.

In a configuration of the invention, the fibre material advantageously has a regular arrangement of fibres. By way of example, a woven structure is conceivable, and as an alternative non-woven products, non-crimp fabrics or other textile layer materials composed of the fibres are also conceivable. Particularly advantageously, the fibre material is introduced into the adhesive joint in single-layered fashion. If the adhesive joint has a relatively large thickness, the fibre material can also be provided in multilayered fashion. The thickness of the fibre material in relation to the adhesive joint should be such that the fibre material is under a certain pressure in the adhesive joint, with the result that it can perform its function as a spacer. One possible material for the fibres is glass fibre. As an alternative, other known fibre materials could also be used.

In a further configuration of the invention, the adhesive layer can be electrically conductive and for this purpose comprise electrically conductive fibre material and/or electrically conductive adhesive. Admixtures of conductive fibres with conventional glass fibres are also possible here, for example with a proportion of approximately 5% to 10%. As an alternative or in addition, an adhesive can be electrically conductive, possibly also as an addition to another adhesive. For later detachment of the adhesive layer or adhesive connection after the sawing of the wafer block, it is possible, by applying current to the adhesive layer, to generate a current flow with resistive heating, for example by lateral contact-connection.

This is one possible mechanism for resolving or incipiently releasing the correspondingly designed adhesive for the detachment of the sawn wafer from the support.

When the adhesive is applied to the fibre material, advantageously significantly more adhesive is applied than is present afterwards together with the fibre material in the adhesive joint. During adhesive bonding, excess adhesive is pressed out from the fibre material until the adhesive joint has a desired joint width. This can be effected for example by means of the abovementioned positioning of the silicon block on the support, such that the weight of said block presses the fibre material impregnated with adhesive. It goes without saying that a further force action can also be provided.

After the silicon block and support have been pressed together, and after the curing of the adhesive, that is to say in the finished arrangement of silicon block and support, advantageously significantly more fibre material than adhesive can be present in the adhesive joint. The strength is thereby brought about primarily by the fibre material. The ratio of fibre material and adhesive can vary here between 3:1 and 5:1, and under certain circumstances be even greater.

In a further configuration of the invention, an adhesive that contains filler can be used for the adhesive joint. The filler used can either be fibre material, for example having a very short fibre length in the range of at most a few millimeters, or the fibres of the other fibre material are considerably longer. As an alternative, filling elements can be used, which are for example beads or the like, which have a uniform size or a uniform diameter. Such filling elements can also help to prevent the adhesive joint from disappearing in places for instance as a result of compression. Such filling elements can be composed for example of glass or the like. As an alternative, they can be composed of the same material as the adhesive, thus giving rise to homogeneous material properties of the adhesive layer. This also applies to the fibres of the fibre material.

These and further features emerge not only from the claims but also from the description and from the drawings, wherein the individual features can be realized, and can constitute embodiments which are advantageous and which are protectable per se and for which protection is claimed here, in each case on their own or as a plurality in the form of subcombinations in an embodiment of the invention and in other fields. The subdivision of the application into subheadings and individual sections does not restrict the statements made under them in terms of their general validity.

BRIEF DESCRIPTION OF THE DRAWINGS

Exemplary embodiments of the invention are illustrated schematically in the drawings and are explained in more detail below. In the drawings.

DETAILED DESCRIPTION OF THE EXEMPLARY EMBODIMENTS

Figure 1:
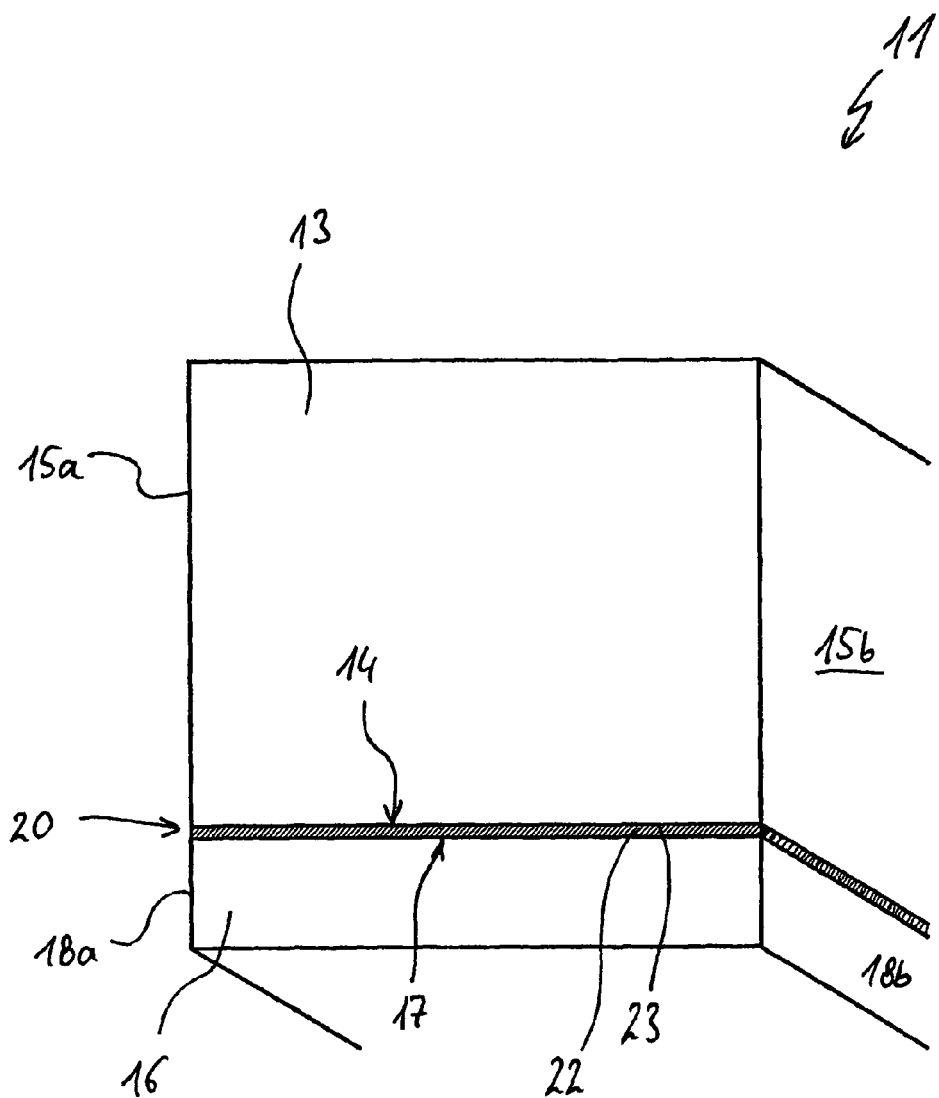
FIG. 1 shows a sectional illustration through an arrangement of support and silicon block, which are connected by means of an adhesive joint composed of fibre material and adhesive.

FIG. 1 illustrates, in a schematic section through an arrangement 11 according to the invention, how a silicon block 13 is adhesively bonded on a support 16 intended therefor. FIG. 1 shows the arrangement 11 after the two parts have been joined together, and for example before the adhesive bond has yet cured or directly afterwards. In this case, the silicon block 13 bears on the support 16 with its underside 14 towards said support, the two sides 15a and 15b being free. The underside 14 of the silicon block 13 forms an adhesive joint 20 with a top side 17 of the support 16. Given dimensions of the silicon block of, for example, 200 mm to 300 mm width and height and the same width for the support 16 and the height thereof of approximately 50 mm, the adhesive joint 20 can amount to a few millimeters, for example 1 mm to 3 mm.

It can be discerned how the adhesive joint 20 is completely filled with fibre material 22 and adhesive 23. Furthermore, it can also be discerned that as a result of the fibre material 22 present in a substantially uniform manner in the adhesive joint 20, the adhesive joint 20 itself has an approximately constant height.

It can also be discerned from FIG. 1 that neither fibre material 22 nor adhesive 23 have emerged from the adhesive joint 20 to a significant extent and reached the sides 18a and 18b of the support 16. This can be achieved for example by removing emerging adhesive 23 or fibre material 22 on account of the compression. As an alternative, fibre material 22 and adhesive 23 can be introduced into the adhesive joint 20 in such a way that hardly anything emerges therefrom. At the sides 18a and 18b of the support 16, however, this does not actually cause any disturbance since it can be mechanically removed relatively easily from the support 16, which is composed of glass, for example, after its use.

FIG. 1 does not illustrate the application of the adhesive 23 to the still separate fibre material 22. However, this can be effected in a manner known per se by the adhesive 23 being applied to the fibre material 22 manually, for example by rolling, spraying or using a brush, wherein the fibre material 22 has already been tailored approximately to the area of the adhesive joint 20. As an alternative, for larger processing quantities it can come from a feed device, for example from a supply roll, and be provided with adhesive 23 by machine or in an automated manner. Furthermore, either the underside 14 of the silicon block 13 or the top side 17 of the support 16, possibly also both, can already be provided with adhesive 23 prior to the application of the fibre material 22.

As has been explained above, the fibre material 22 can comprise glass fibres in the form of woven mats, but equally also other fibres, or be present in some other form. In this case, the individual fibres should, however, have approximately the direction of the course of the fibre matt, in order that an approximately constant thickness can be achieved for an approximately constant adhesive joint 20. The adhesive 23 used can be an epoxy resin, alternatively other resins or adhesives used for such fibre composite materials, for example including an abovementioned adhesive having a certain electrical conductivity. Curing can be accelerated by heating.

Figure 2:
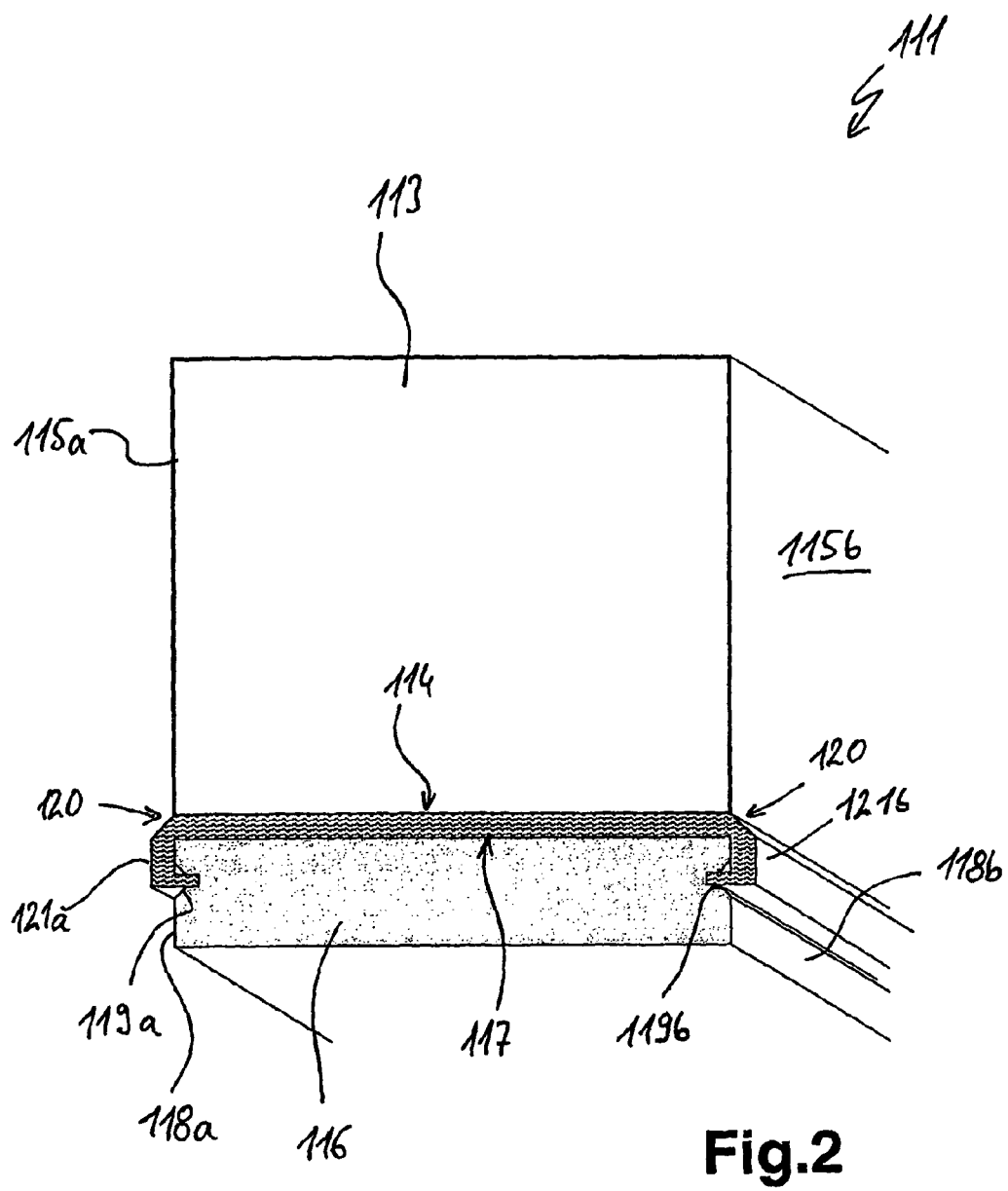
FIG. 2 shows an alternative to the arrangement in FIG. 1, wherein the fibre material impregnated with adhesive engages over the support and engages into lateral grooves.

FIG. 2 illustrates an alternative embodiment of an arrangement 111. Here too, a silicon block 113 having sides 115a and 115b and an underside 114 is connected to a support 116 by means of an adhesive joint 120. Once again fibre material 122 together with adhesive 123 is situated in the adhesive joint 120. Unlike in FIG. 1, however, here the fibre material 122 is led laterally beyond the adhesive joint 120 and has a course with a type of interlocking 121a and 121b on the two sides. This interlocking 121 engages into grooves 119a and 119b in the sides 118a and 118b of the support 116. As can readily be discerned from FIG. 2, this embodiment of the fibre material 122 together with adhesive 123 forms a particularly fixed connection to the support 116 precisely as a result of the interlockings 121a and 121b. An even stronger connection than that in FIG. 1 can thus be produced.

In order to produce the arrangement 111, in a manner similar to that described for FIG. 1, the fibre material 122 impregnated or provided with adhesive, and laterally projecting significantly beyond the adhesive joint 120, is laid or bent over the upper region of the sides 118a and 118b of the support 116 in such a way that it engages by its outer edges into the groove 119a and 119b. Precisely the interlocking 121a and 121b shown is formed as a result. Even though the course of said interlocking is illustrated as relatively angular in FIG. 2, in practice it can be more rounded or run precisely along the sides 118a and 118b of the support 116. A shaping of this interlocking 121a and 121b is also possible by means of aids such as externally applied moulds, for example. These moulds can be embodied for example in such a way that they not only press the laterally projecting fibre material 122 into the grooves 119a and 119b, but also bring about overall a shaping, in particular a corresponding outer contour of the interlockings 121a and 121b. It can be seen from FIG. 2 that, in order to produce this arrangement 111, the fibre material 122 should project beyond the sides of the adhesive joint 120 by approximately 30 mm to 50 mm at the sides.

As an alternative to the interlocking 121 by fibre material, it may further be conceived that only the adhesive is laterally embracing the support 16. In this case, the achieved stability may be somewhat less, but still advantageous.

In addition to the fibre material 22 together with adhesive 23 in the adhesive joints 20 as illustrated in FIGS. 1 and 2, the abovementioned filling elements can also be provided. The latter can be applied to the fibre material either after the adhesive or else already together with the adhesive or mixed with the latter. As an alternative, they can be applied or scattered on after the placement of the fibre material 22 provided with adhesive for example onto the top side 17 of the support 16.

Advantageously, the fibre material 22 provided with adhesive 23 is applied first to the top side 17 of the support 16. Afterwards, the silicon block 13 is placed with its underside 14 thereon. In addition to its own weight, further pressure can be exerted from above for a stable connection and also in order to press as much adhesive 23 as possible out of the fibre material 22. In this case, care should be taken, for example by means of externally attached alignment means, to ensure that support 16 and silicon block 13 have a precise orientation with respect to one another, are at least parallel or underside 14 is parallel to top side 17.

The invention claimed is:

1. An arrangement of a silicon block on a support for said silicon block, wherein said silicon block is fixedly adhesively bonded to said support, wherein said adhesive bonding comprises an adhesive layer in an adhesive joint between said silicon block and said support, said adhesive layer comprising fibre material impregnated with adhesive,
wherein said adhesive impregnated fibre material projects laterally beyond said support and is connected to and laterally engages said support.

2. The arrangement according to claim 1, wherein after said silicon block and said support have been pressed together, significantly more of said fibre material than said adhesive is present in said adhesive joint.

3. The arrangement according to claim 2, wherein said fibre material is present in said adhesive joint in an amount 3 to 5 times the amount of said adhesive.

4. The arrangement according to claim 1, wherein said support has a recess or a groove on its side and said fibre material impregnated with said adhesive extends into said recess or said groove in a manner of an interlocking of said support by said fibre material for a reinforced fastening of said fibre material or said adhesive layer to said support.

5. The arrangement according to claim 1, wherein said adhesive layer is electrically conductive, with electrically conductive fibre material or electrically conductive adhesive for later detachment of said adhesive layer or said adhesive connection by heating by means of applying current to said adhesive layer resulting in resistive heating by said current flow.

6. The arrangement according to claim 1, wherein said adhesive for said adhesive joint contains filler, wherein said filler is either fibre material or filler elements.

7. The arrangement according to claim 6, wherein said filler elements are beads, which have an approximately uniform size.

8. The arrangement according to claim 7, wherein said filler elements are composed of glass or the same material as said adhesive.

9. A method for fastening a silicon block to a support for said silicon block, wherein said silicon block is fixedly adhesively bonded to said support by an adhesive bonding, the method comprising the steps of:
impregnating a fibre material with adhesive to form an adhesive layer; and
effecting an adhesive bonding by forming an adhesive joint between said silicon block and said support using said adhesive layer,
wherein said adhesive impregnated fibre material projects laterally beyond said support and is connected to and laterally engages said support.

10. The method according to claim 9, wherein said fibre material, prior to fitting to said silicon block or the support, is impregnated with said adhesive.

11. The method according to claim 10, wherein said fibre material is impregnated with said adhesive by spraying on from at least one side.

12. The method according to claim 10, wherein prior to application of said fibre material in said adhesive joint, said adhesive is superficially applied on at least one side of said silicon block or said support.

13. The method according to claim 9, wherein said support has a recess or a groove on its side and said adhesive impregnated fibre material extends into said recess or said groove of said support in a manner of an interlocking of said support by said fibre material for a reinforced fastening of said fibre material or said adhesive layer to said support.

14. The method according to claim 9, wherein said adhesive layer is electrically conductive, with electrically conductive fibre material or electrically conductive adhesive, and wherein for a later detachment of said adhesive layer or said adhesive connection heat is applied by means of applying current to said adhesive layer effecting a resistive heating in said adhesive layer by current flow.

15. The method according to claim 9, wherein significantly more of said adhesive is applied to said fibre material than is present later together with said fibre material in said adhesive joint, wherein afterwards excessive adhesive is squeezed out from said fibre material.

16. The method according to claim 15, wherein excessive adhesive is squeezed out from said fibre material only by the weight of said silicon block resting on top of said support without additional application of a force.

* * * * *